H. M. SPRAGUE.
MOUSE TRAP.
APPLICATION FILED DEC. 17, 1913.
1,140,542.
Patented May 25, 1915.
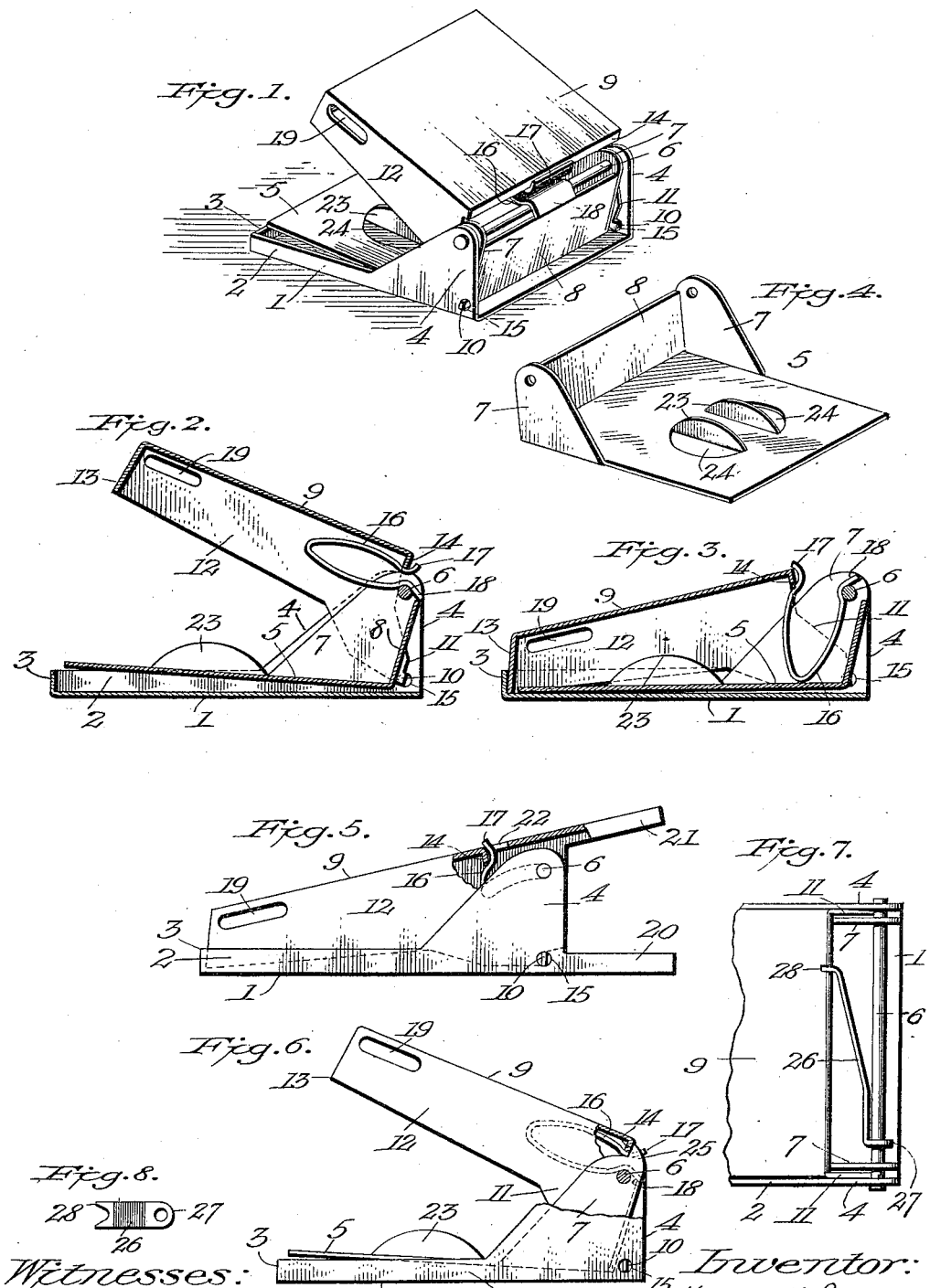

UNITED STATES PATENT OFFICE.

HORACE M. SPRAGUE, OF DENVER, COLORADO.

MOUSE-TRAP.

1,140,542.   Specification of Letters Patent.   Patented May 25, 1915.

Application filed December 17, 1913. Serial No. 807,277.

*To all whom it may concern:*

Be it known that I, HORACE M. SPRAGUE, a citizen of the United States of America, residing in the city and county of Denver and State of Colorado, have invented a new and useful Mouse-Trap, of which the following is a specification.

My invention relates to mouse and other rodent catching traps; and the objects of my invention are: First, to provide a trap for mice and other rodents that sets itself when opened, and that can be opened quickly by the fingers. And second, to provide a strong trap that is small in size and that is provided with a bait holding plate that is so sensitive that the slightest touch against it will spring the trap. I attain these objects by the mechanism illustrated in the accompanying drawings, in which:

Figure 1, is a perspective view of the improved trap, showing the same in an open or "set" position. Fig. 2, is a vertical, longitudinal, sectional view thereof, on an enlarged scale, the trap being open or "set" as in Fig. 1. Fig. 3, is a sectional view similar to Fig. 2, but showing the trap in a closed position. Fig. 4, is a perspective view of the combined bait holding and tripping member of the trap. Fig. 5, is a side view of the trap, partly broken away, showing the jaws thereof provided with rearward extensions to facilitate the setting or opening of the said trap. Fig. 6, is a side view of a trap, partly broken away to show a slight modification in the construction of the tripping plate. Fig. 7, is a plan view of the rear portion of the trap, showing a modification in the style of spring for operating the same. And Fig. 8, is an end view of the spring shown in Fig. 7.

Similar letters of reference refer to similar parts throughout the several views.

Referring to the drawings,—the numeral 1 designates the base plate of my improved mouse trap. This base plate comprises a flat plate of sheet tin or other suitable metal, that is provided with side lip portions 2, and with an end lip 3 that extends across its front end. These sides 2 are extended upwardly at their rear end portions far enough to form a pair of supporting ears 4, that are arranged and adapted to pivotally support the bait holding trap tripping plate 5, by any suitable means, but preferably by a pin 6, which is extended through the ears 4, and through upwardly extending ears 7, on the rear portion of the plate, and is secured therein against displacement therefrom by any suitable means, but preferably by being upset at its aperture entering end after being inserted therein.

The trap tripping plate 5 is arranged to fit loosely inside of the side lips of the base plate, and to extend along close to but just above it so that it clears the inside surface of the base plate throughout its whole length, and its only support is its pivotal connection with the pin 6, from which it is suspended at its rear end, by means of the upwardly-projecting ears 7, and its front portion tilts down and rests against the base plate when the said trap is not set in mouse catching position. When, however, the trap is set in mouse catching position, the plate 5 stands with its front edge raised even or substantially even with the top edge of the front end lip 3. The plate terminates at its rear end in an upturned lip 8, for a purpose to be explained fully hereinafter. Above the base plate and trip plate, is positioned the movable plate or jaw 9. This movable jaw is the coöperating mouse catching jaw, and it is pivotally secured to the rear end portion of the base plate in any suitable manner, but preferably by means of trunnion portions 10, which are formed at the ends of depending portions 11, that are formed on the rear end of the opposite sides of the plate, and extend rearwardly of the rear end of the plate. This movable jaw comprises a flat plate portion that is provided with depending sides 12 that extend along its whole length and join the depending members 11. The front end of the plate is also provided with a depending mouse striking and gripping lip 13, which preferably depends from it even with the sides of the plate. This movable jaw is positioned with its rear end slightly above and at a sufficient distance from the pivotal pin 6, to leave room for a spring to be inserted between its end and the pivotal pin 6. The rear end of the movable plate terminates in a very slight depending lip 14, which acts to stiffen its rear edge, and its side members 11 are made long enough to permit its trunnions to enter apertures 15 that are formed in the sides of the base plate close to its floor portion, and allow its rear end portion and lip 14 to stand at a short distance above the pivotal pin 6. This movable mouse striking and gripping jaw is consequently pivotally connected to the base plate, and it is so arranged and pivoted to the base plate that its front lip 13 will swing down on its pivotal trunnion just inside of the end lip 3, and down against the floor of the base plate, and the edges 3 and 13 form the mouse gripping members of the trap.

I employ a spring to force the movable jaw down against the base plate of the trap, and use a spring of strength enough to strike a mouse or other rodent a hard blow and to hold a mouse or rodent between the lips 3 and 13 of the trap when caught by it.

There are a number of ways in which this feature of my invention may be applied to the trap. I preferably, however, carry out this feature of my invention in the following manner:

Between the pivotal pin 6 of the bait holding plate, and the rear end portion and depending lip 14 of the movable jaw, I place a spring 16, which is preferably of a yoke or V-shape, and which is provided with bent out ends 17 and 18 that are arranged and adapted to fit partially around the pin and the rear end of the plate, while its curved end extends into the trap close to the floor of the base plate, and the ends of this spring and the relative position of the rear end of the movable jaw is such that when the jaw is raised into its operative open position, it is carried slightly beyond the centers of its pivoting trunnions and automatically locks itself in an open position, as the expansive tension of the spring, which is pressed together far enough to give the desired resilient pressure, holds the rear end portion of the movable plate upward above the pivotal pin 6, with a pressure of sufficient force to lock it in an open position. The opening movement of the movable jaw also raises the spring bodily upward, and its lip 18 is moved around the pin 6 until it projects over and downwardly from it far enough to be engaged lightly by the upper edge of the rear end 8 of the bait plate, which moves in contact with it when the bait plate is set in operative mouse catching position in the base plate, the engaging relation between the end of the spring and the end of the bait plate being such that the slightest pressure on the bait plate will push the spring and the jaw over their dead center position which will cause the spring to snap the jaw closed. The upward movement of the jaw is defined by the engagement of its depending member 11 with the pin 6.

In order to assist in opening the trap, I provide the front end of the movable jaw with apertures 19, which are placed on its opposite sides close to its front end.

In Fig. 5, I illustrate a slight modification in the arrangement of the rear end portion of the base plate, and of the movable jaw, they being provided with extended portions 20 and 21 respectively, which are arranged to project rearwardly from the ends of the base plate and of the movable jaw, in such a manner that they can be used as finger grasping members, and are to be used by an operator to open the movable jaw by pressing the members together with the fingers of one hand. In order that the rearwardly projecting member of the movable jaw, cannot interfere with the arrangement of the central portion of the rear end of the movable jaw, where the depending lip 14 and the end 17 of the spring bear, I cut an aperture 22 through the movable plate, at its center, where the end of the spring is, to engage the end portion of the movable jaw, and form in this aperture a shoulder by turning down a short tongue portion in the aperture, to form a reinforced end or shoulder portion for the end 17 of the spring to bear against, which arrangement is just like the construction shown in Figs. 1 and 2.

The bait plate may be provided with any suitable device for securing bait of any kind thereto. I preferably, however, loosen two tongue portions 23, from the central portion of the plate, and turn them upward into a vertical position, thus leaving apertures 24 in said plate, and any suitable bait may be pressed in between the said tongues 23, which will hold the said bait against accidental displacement.

In Fig. 6, which is a side view of the trap in open or set position, I have illustrated a slight modification in the manner of springing the trap. In this arrangement, the ears 7 of the trip plate 5 are formed, at their upper ends, with projections 25, which engage the rear depending end 14 of the swinging jaw 9, when the trap is set, and when the forward end of the said plate is depressed, these projections 25 bear against the said end 14, and move the same beyond a line drawn through the axes of the trunnions 10 and pin 6, thereby permitting the jaw 9 to be thrown by the spring 16. If desired, the projections 25 can be used in conjunction with the lip 8, or they may be used independently of the said lip.

In Fig. 7, is shown a modification in which the spring 16 is dispensed with, and a spring 26 of a different character is employed. This spring is in the form of a slightly bent blade, one end of which is turned at right angles, as shown by 27, and is apertured to receive the pin 6. The other end 28, is recessed, and bears against the rear end of the plate 9, which is preferably rolled or rounded to receive it. As the plate 9 is raised, the spring 26 is thereby compressed or straightened, and at the same time turns on the pin 6, and when the end of the plate 9 passes the center line of the trunnions 10 and pin 6, the plate is held in the same manner as with the spring 26.

The operation of setting my improved trap is as follows: The operator grasps the base plate in one hand and the movable jaw in the other, by catching it at its front end portion and pressing his thumb and fore-finger into the apertures in its sides, which acts to prevent the thumb and fore-finger from slipping off of it. The movable jaw is then lifted up as high as it will go, which is just over its pivotal center, and as it is lifted it compresses the spring, which exerts a strong enough upward pressure on it to hold it still over its center. This lifting movement of the spring causes its lower end 18 to slide slightly over or around the pin 6, and engage the edge of the lip 8 of the trip plate, and thereby tilt the same, so that its front end is on a level or nearly so with the side and end lips of the base plate. The trap is then placed wherever desired, and the slightest pressure of a mouse or other rodent on the bait plate, will cause its front end to move enough to cause its rear end to push against the spring and move it and the rear end of the movable jaw over its center, when the jaw will spring down with great force and strike and grip the mouse or other rodent that moved the bait plate.

Having described my invention, what I claim as new and desire to secure by Letters Patent, is:

1. A mouse trap comprising a base plate, a jaw hinged thereto, a pin mounted in said base plate, a combined trip and bait holder mounted on said pin, a spring interposed between said pin and the rear end of the jaw and adapted when compressed by the opening of the jaw to hold said jaw open when its rear end passes a given point, and means connected with the trip for engaging said spring, when the trip is depressed, whereby the rear end of the jaw is moved out of line with said point, permitting the spring to expand and forcibly close said jaw.

2. A mouse trap comprising upper and lower jaws in hinged relation, a transverse pin supported by the lower jaw, a spring interposed between said pin and the rear end of the upper jaw, which is compressed when the upper jaw is raised, and swung upon said pin, until said rear end passes the outer line of said pin and the pivotal point of the upper jaw, a combined trip and bait holder pivotally mounted on said pin, having a portion which is engaged by one end of said spring, by which said trip is tilted, and which acts to rock the spring when the trip is depressed, whereby the rear end of the upper jaw is moved beyond said center line, permitting the spring to expand and thereby forcibly close the jaw.

3. In a mouse trap, a stationary jaw having upward extensions, a pin mounted in said extensions, a jaw pivotally connected to the stationary jaw at points beneath and in line with said pin, whose rear end is forward of said pin, an expansion spring, the ends of which bear upon said pin and the rear end of said pivoted jaw, and which is compressed and swung upon said pin when the pivotal jaw is raised, means for stopping the upward movement of said jaw when its rear end passes the center line of its pivotal points and of said pin, a combined trip and bait holder pivotally mounted on said pin having a rear extension which is engaged by one end of said spring, whereby the trip is tilted, the depressing of said trip causing its rear extension to move the spring whereby the rear end of the pivoted jaw is moved beyond said center line, permitting the spring to expand, thereby forcibly closing the jaw.

4. In a mouse trap, a stationary jaw having side extensions at its rear end, a pin mounted in said extensions, a movable jaw having depending members pivotally connected to said stationary jaw below said pin, the rear end of which terminates forward of said pin, the upward movement of said jaw being defined by the engagement of its depending members with said pin, in which position its rear end is back of a center line extending through its pivotal points, and the axial center of said pin, an expansive spring the ends of which bear upon said pin and the rear end of the movable jaw, which is compressed and swung upon said pin as the jaw is raised, and locks the same when its rear end passes said center line, a combined trip and bait holder, having a rear extension which is engaged by one end of said spring to tilt said trip, and which moves said spring to shift the position of the rear end of said jaw, whereby the spring is permitted to expand and thereby forcibly close the jaw.

5. In a mouse trap, a stationary jaw having parallel ears, a pin mounted in the upper ends of said ears, a swinging jaw having downward extensions, the ends of which are pivotally connected to said ears below said pin, the rear end of said swinging jaw being forward of said pin, said extensions being arranged to engage said pin when the rear end of the jaw is swung past a line extending through its pivotal axis, and the axial center of said pin, a V-shaped spring, the ends of which engage said pin and the rear end of the jaw, and which is swung by the raising of the jaw and locks the same in a raised position when its rear end passes the said line, and a combined trip and bait holder having an upturned rear end which is engaged by one end of said spring and the trip thereby tilted when the jaw is raised, said upturned end being arranged to move the spring when the trip is depressed, thereby shifting the position of the said rear end, whereby the spring is permitted to expand and forcibly close the jaw.

6. A mouse trap comprising a lower jaw having upward side extensions at its rear end, an upper jaw having depending extensions at its rear end, the extremities of which are pivotally mounted in the lower portions of the extensions of the lower jaw, the rear edge of said upper jaw being forward of its pivotal connection when the said jaw is closed, a pin mounted in the upper ends of the extensions of the lower jaw, a bent spring within the trap, the ends of which engage respectively the rear edge of the upper jaw and the said pin, and a combined bait holder and trip plate having upward side extensions at its rear end which are pivotally mounted upon the said pin, and an upturned end plate the edge of which is in position to be engaged by the spring when the trap is set to raise the forward end of said plate, whereby when the plate is depressed the spring is shifted so as to expand and spring the trap.

In testimony whereof I affix my signature in presence of two witnesses.

HORACE M. SPRAGUE.

Witnesses:
G. SARGENT ELLIOTT,
ADELLA M. FOWLE.

Copies of this patent may be obtained for five cents each, by addressing the "Commissioner of Patents, Washington, D. C."